US 6,708,115 B1

(12) United States Patent
Nagasaka et al.

(10) Patent No.: US 6,708,115 B1
(45) Date of Patent: Mar. 16, 2004

(54) VEHICLE SPEEDOMETER

(75) Inventors: Chikao Nagasaka, Niwa-gun (JP);
Yoshimasa Kunimatsu, Niwa-gun (JP);
Masato Nishikawa, Niwa-gun (JP);
Toshiyuki Isogai, Niwa-gun (JP)

(73) Assignee: Kabushiki Kaisha Tokai-Rika-Denki-Seisakusho, Aichi (JP)

( * ) Notice: Subject to any disclaimer, the term of this patent is extended or adjusted under 35 U.S.C. 154(b) by 0 days.

(21) Appl. No.: 09/914,996

(22) PCT Filed: Feb. 22, 2000

(86) PCT No.: PCT/JP00/00995
§ 371 (c)(1),
(2), (4) Date: Dec. 26, 2001

(87) PCT Pub. No.: WO00/54058
PCT Pub. Date: Sep. 14, 2000

(30) Foreign Application Priority Data

Mar. 8, 1999 (JP) .......................................... 11-060618

(51) Int. Cl.$^7$ ............................................. G01C 21/00
(52) U.S. Cl. ...................................................... 701/214
(58) Field of Search .............................. 701/1, 213, 216, 701/224; 342/357, 457

(56) References Cited

U.S. PATENT DOCUMENTS 5,890,092 A * 3/1999 Kato et al. .................. 701/216
5,899,954 A * 5/1999 Sato ............................ 701/207

FOREIGN PATENT DOCUMENTS

| JP | 07-260502 |   | 10/1995 |          |
|----|-----------|---|---------|----------|
| JP | 07-280824 | * | 10/1995 | .......... G01P/3/54 |
| JP | 08-075485 |   | 3/1996  |          |
| JP | 09-049852 |   | 2/1997  |          |

* cited by examiner

Primary Examiner—Thu V. Nguyen
(74) Attorney, Agent, or Firm—Nixon Peabody, LLP

(57) ABSTRACT

A speedometer for a vehicle capable of displaying a vehicle speed and a traveling distance highly accurately and of providing highly accurate speed information to a system utilizing the speed information is provided. A speedometer is connected to a navigation device that periodically corrects corrected data of a traveling distance per a pulse on the basis of a GPS signal and a vehicle speed pulse signal from a vehicle speed sensor, and outputs the corrected data to a navigation correction information data storage section of the speedometer. A data switching section outputs to a speed computation section the corrected traveling distance data per a pulse that is stored in the navigation correction information data storage section.

2 Claims, 5 Drawing Sheets

VEHICLE SPEEDOMETER

TECHNICAL FIELD

The present invention relates to a speedometer for a vehicle for indicating a vehicle speed and a travelling distance that are computed on the basis of vehicle speed pulse signals outputted from a vehicle speed sensor.

DESCRIPTION OF THE RELATED ART

Conventionally, a speedometer installed at a passenger car or the like indicates a vehicle speed and a travelling distance by utilizing vehicle speed pulse signals outputted from a vehicle speed sensor mounted at a propeller shaft or the like which connects both a transmission and a differential gear.

As to the vehicle speed pulse signal, the number of outputted pulses per a rotation of a wheel is established, and a travelling distance per a pulse is also previously established on the assumption that the tire attached to a vehicle is standard. Namely, the travelling distance can be determined by counting the number of pulses of the vehicle speed pulse signal and by multiplying the counted value by the travelling distance per a pulse. Further, a vehicle speed can be determined by determining a travelling distance per unit time.

PROBLEMS TO BE SOLVED BY THE INVENTION

However, when a tire is worn or when a tire size is changed, in some cases, the travelling distance previously established per a pulse and the actual travelling distance per a pulse do not correspond to each other. Further, when vehicles are of the same car family, in some cases, tire sizes thereof are different from one another in accordance with their grades. Accordingly, even when the same, in some cases, travelling distances per a pulse thereof are different from one another, depending on their grades. Therefore, a computed vehicle speed or a computed travelling distance may cause an error.

In recent years, due to the increasing demand for the control of automobiles, for example, there have been proposed various systems using speed information such as an AHS (Automated Highway System) for performing an automatic drive. In a system utilizing such speed information, there is highly demanded for the greater accuracy of speed information or travelling distance.

In view of the aforementioned facts, an object of the present invention is to provide a speedometer for a vehicle capable of indicating a highly accurate speed or a highly accurate travelling distance and of providing highly accurate speed information to a system utilizing the speed information.

DISCLOSURE OF THE INVENTION

In order to accomplish the above-described object, a speedometer for a vehicle according to claim 1 of the present invention comprises: first storage means for storing travelling distance data per unit pulse of a vehicle speed pulse signal outputted from a vehicle speed sensor, correction means for correcting the travelling distance per unit pulse outputted from the vehicle speed sensor; second storage means for storing the corrected travelling distance data per unit pulse inputted from the correction means; and computation means for computing at least one of a vehicle speed and a travelling distance on the basis of the travelling distance data per unit pulse stored in the first storage means when the corrected travelling distance data per unit pulse is not stored in the second storage means, and for computing at least one of the vehicle speed and the travelling distance on the basis of the corrected travelling distance data per unit pulse when the corrected travelling distance data per unit pulse is stored in the second storage means.

In accordance with claim 1 of the present invention, travelling distance data per unit pulse of a vehicle speed pulse signal outputted from a vehicle speed sensor is stored. The second storage means stores the corrected travelling distance data per unit pulse (corrected data) inputted from the correction means, preferably, the navigation device, for correcting a travelling distance per unit pulse of a travelling speed pulse signal outputted from the vehicle speed sensor.

The navigation device is able to detect the position of a vehicle on the basis of GPS signals from a plurality of GPS satellites disposed in the space at an altitude of about 20,000 km (a so-called GPS navigation method). Further, in some cases, since the GPS signal includes an error, the navigation device receives a DGPS (Differential GPS) signal that contains correction information for correcting the vehicle position detected by the GPS signal as needed, thus correcting the vehicle position by the received correction information. Moreover, in the case of a navigation device capable of displaying thereon the calculated vehicle position so as to superimpose the same on a map, the vehicle position can be calculated more highly accurately by making use of a so-called map matching in which a road on which the vehicle is travelling is predicted and the vehicle position is matched onto the road.

Due to the vehicle pulse signal outputted from a vehicle speed sensor and the travelling direction data outputted from a gyro sensor, the navigation device can carry out a so-called independent navigation method. The independent navigation method and the GPS navigation method can be used in combination with each other to thereby calculate the vehicle position more highly accurately. Such a navigation device has a function of highly accurately correcting a travelling distance per unit pulse of a vehicle speed pulse signal outputted from the vehicle speed sensor. Further, a so-called "learning" is carried out to further improve the accuracy in correcting a travelling distance per unit pulse.

The computation means computes at least one of a vehicle speed and a travelling distance on the basis of travelling distance data per unit pulse that is stored in the first storage means when the corrected data is not stored in the second storage means, and the computing means computes at least one of the vehicle speed and the travelling distance on the basis of the corrected data stored in the second storage means when the corrected data is stored in the second storage means.

A travelling distance can be determined by counting the number of pulses of a vehicle speed pulse signal and by multiplying this counted value by the traveling distance data per unit pulse or the corrected data. A vehicle speed can be determined from a traveling distance data per unit time.

Thus, since the corrected data, i.e., the corrected travelling distance per unit pulse is utilized to determine a vehicle speed and a travelling distance, even when a tire is worn or even when a tire size is changed, the vehicle speed and the travelling distance are corrected highly accurately. Further, for example, in the case in which the power is not supplied to the navigation system, or in the case in which it takes a long time to rise the navigation device immediately after the power is supplied, and the like, the corrected data prestored in the second storage means, namely, the corrected travelling distance data per unit pulse can be used to compute a vehicle speed and a travelling distance. Consequently, the vehicle speed and the travelling distance can be computed highly accurately.

Claim 2 is the speedometer for a vehicle according to claim 1 of the present invention, further comprising outputting means for outputting a vehicle speed that is computed by the computation means to a speed information service system.

In accordance with claim 2 of the present invention, since the speedometer for a vehicle further comprises the outputting means for outputting a vehicle speed that is computed by the computation means to a speed information service system, the corrected vehicle speed is outputted to a system using speed information such as an AHS or the like to thereby carry out a highly accurate control.

DESCRIPTION OF EMBODIMENTS OF THE INVENTION

With reference to drawings, a detailed description of an embodiment of the present invention will be made hereinafter.

Figure 1:
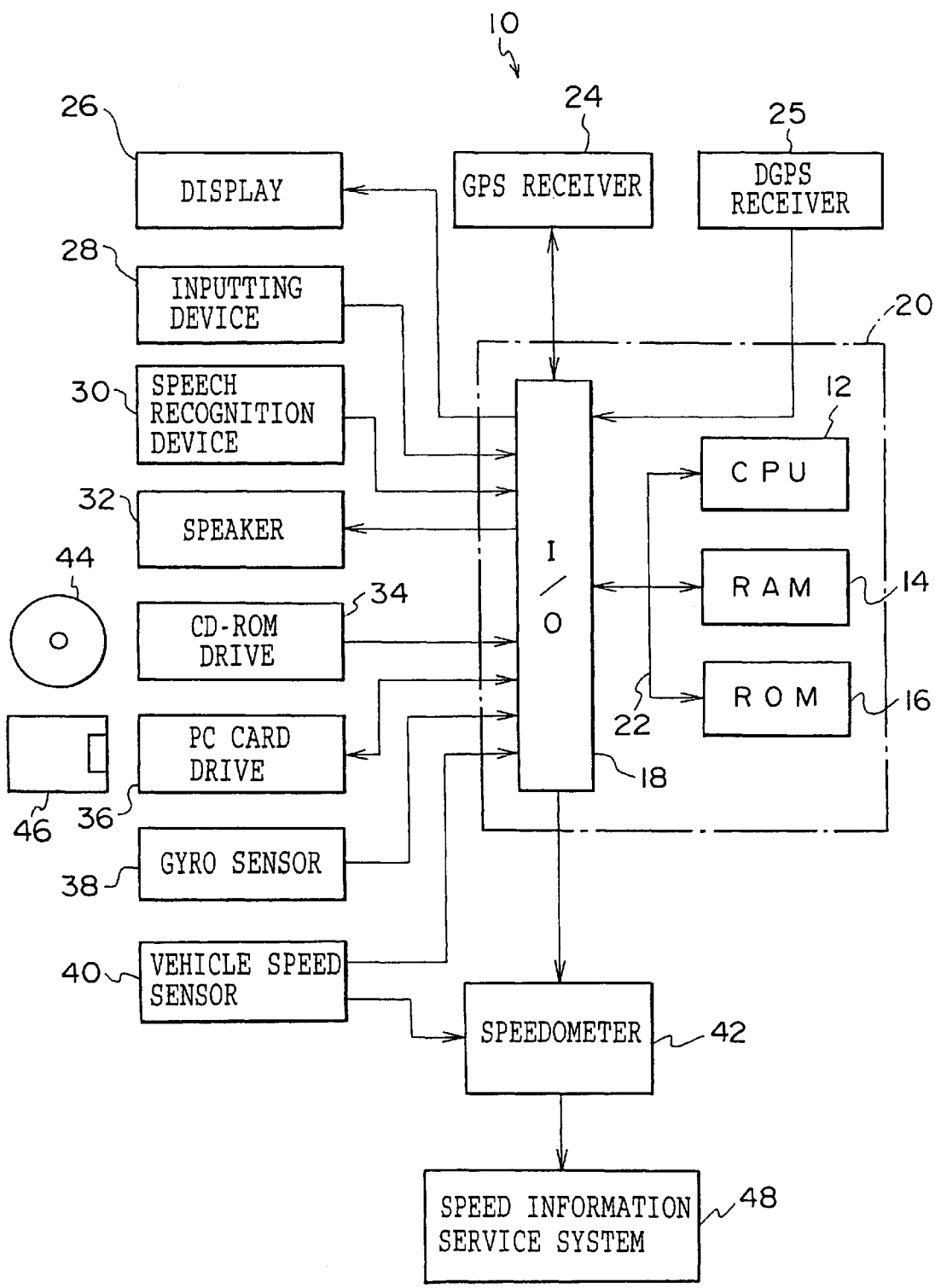
FIG. 1 is a block view illustrating a schematic structure of a navigation device according to an embodiment of the present invention.

In FIG. 1, there is shown a schematic structure of a navigation device 10 according to an embodiment of the present invention.

The navigation device 10 has a microcomputer 20 which is structured such that a CPU 12, an RAM 14, an ROM 16, and an input/output port (I/O) 18 are respectively connected to one another via a bus 22 so that they are enabled to receive and/or transmit command or data. Further, at the ROM 16, there is stored a control routine which will be described later.

To the I/O port 18 are connected a GPS receiver 24, a DGPS receiver 25, a display 26, an inputting device 28, a speech recognition system 30, a speaker 32, a CD-ROM drive 34, a PC card drive 36, and a gyro sensor 38. Moreover, to the navigation device 10 are connected a vehicle speed sensor 40 and a speedometer 42 installed at the side of an unillustrated vehicle.

The GPS receiver 24 is used to receive GPS signals from a plurality of GPS satellites that are disposed in the space at the altitude of about 20,000 km to thereby calculate the position of a vehicle. The DGPS (Differential GPS) receiver 25 receives correction information for correcting errors of the GDP signals received by the GPS receiver 24. Due to the correction information, the vehicle position computed from the received GPS signals is corrected so that the vehicle position can be specified highly accurately.

The display 26 is a display formed by a liquid crystal and a CRT (cathode ray tube), and is able to display a mark, that indicates a vehicle position computed by the GPS receiver 24 so as to be overlapped with a map image.

The inputting device 28 is used to perform navigation operations such as inputting of destination, retrieval or registration of specified positions, access of map images, and the like. Examples of the inputting device 28 include a wireless remote control unit, a wired remote control unit, a touch panel, and the like.

The navigation operations described above can be performed by the speech recognition device 30 through speeches. The speech recognition device 30 is able to recognize unspecified speaking person's speeches. Standard speech patterns of commands for performing a navigation operation are registered previously in the speech recognition device 30. The standard speech patterns, and a speech pattern obtained through a feature extraction processing of a speech inputted to the speech recognition device 30 during the operation thereof are compared with each other (i.e., a pattern matching). The most analogous speech pattern to the standard speech pattern is selected as a command.

The speech recognition device 30 can recognize the speeches not of an unspecified speaking person but of a specified speaking person. In this case, commands given by the specified speaking person are recorded and registered as speech patterns. The registered speech patterns are compared with a speech pattern obtained through the speech inputted during the operation of the speech recognition device 30. Consequently, the most similar speech pattern to the registered speech pattern is chosen as a command.

The speaker 32 provides a driver with speech information. The speech information includes route guide information which indicates a direction in which a vehicle should turn at a point of intersection or the like, for example, when a route to a destination is established by a driver, information of the results of recognition when a speech spoken by a driver is recognized by the speech recognition device 30, and the like.

The CD-ROM drive 34 is used to read various data such as map information recorded in a CD-ROM 44. The read data is temporarily stored in the RAM 14. The map information recorded in the CD-ROM 44 includes road data (for example, classified information of road such as public road, highway, or the like, information of intersections, and the like), place names, telephone numbers, and the like.

A control program can be stored in the CD-ROM 44 in place of the ROM 16. Further, a storage medium such as a DVD-ROM can also be used in place of the CD-ROM 44. In this case, a DVD-ROM drive can be used in place of the CD-ROM drive 34.

The PC card drive 36 is used to read information stored in a PC card 46 or to write information thereinto. For example, various data such as point registration data can be stored in the PC card 46.

The control program can be stored in the PC card 46 in place of the ROM 16. A storage medium such as an MD, an MO, or a floppy disc can also be used in place of the PC card 46. In this case, the MD disc drive, the MO disc drive, or the floppy disc can be used in place of the PC card drive 36.

The gyro sensor 38 is use to detect angular velocity when a vehicle changes the direction thereof and to output angular velocity data and travelling direction data. This gyro sensor 38 is, as an example, a vibratory-type gyro comprised of a piezoelectric element or the like.

The vehicle speed sensor 40 outputs a pulse signal with a cycle according to the rotation of a wheel. Namely, the number of outputted pulses per a rotation of a wheel of the pulse signal is established previously, and a travelling distance per a pulse is also established previously. In other words, the travelling distance of a vehicle can be calculated by counting the number of pulses. On the basis of a travelling distance per unit time, a vehicle speed of the vehicle can be calculated.

A speed information service system 48 is connected to the speedometer 42. Speed information is outputted to the speed information service system 48. For example, the speed information service system 48 includes: a sensing-type cruise control system which controls at a fixed value the distance between two vehicles while maintaining the distance between two vehicles; a curve recognition speed control system in which admission velocity of a vehicle is controlled according to a curvature, an AHS (Automated Highway System) in which a vehicle is automatically driven, and a platoon travelling system in which a vehicle travels by following a forward vehicle, and the like.

Figure 2:
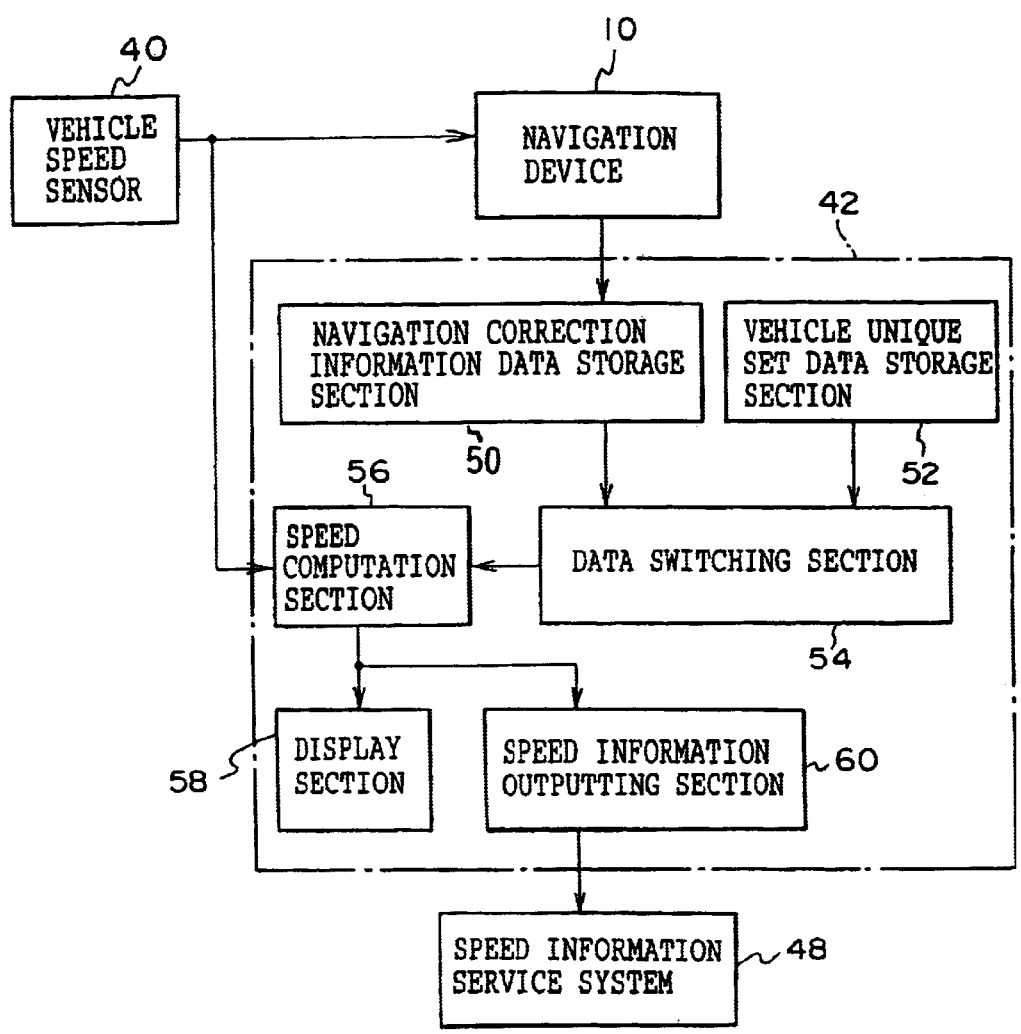
FIG. 2 is a block view illustrating a schematic structure of a speedometer.

As shown in FIG. 2, the speedometer 42 is provided with a navigation correction information data storage section 50 and a vehicle unique set data storage section 52. The navigation correction information data storage section 50 is structured by, for example, a non-volatile RAM or the like, and is connected to the navigation device 10. The navigation correction information data storage section 50 stores therein navigation correction information data outputted from the navigation device 10. The navigation correction information data includes: travelling distance data per a pulse that has been corrected by the navigation device 10; status information showing as to whether or not the navigation device 10 is under activation, as to whether or not the correction value of a travelling distance per a pulse is under learning, and the like. The vehicle unique set data storage section 52 is structured by, for example, the ROM or the like to thereby set (store) therein the unique travelling distance data per a pulse for each vehicle before the shipping.

The navigation correction information data storage section 50 and the vehicle unique set data storage section 52 are connected to a data switching section 54. The data switching section 54 outputs to a speed computation section 56 one of the travelling distance data per a pulse that is corrected by the navigation device 10 and that is stored in the navigation correction information data storage section 50 and the travelling distance data per a pulse that is stored in the vehicle unique set data storage section 52.

At the speed computation section 56, on the basis of the travelling distance data per a pulse outputted from the data switching section 54 (i.e., the corrected travelling distance data per a pulse that is stored in the navigation correction information data storage section 50 or the travelling distance data per a pulse that is stored in the vehicle unique set data storage section 52) and the vehicle speed pulse signal outputted from the vehicle speed sensor 40, the vehicle speed and the travelling distance are computed, and as vehicle speed information, they are outputted to an indication portion 58 and a speed information outputting section 60. Further, the speed information outputting section 60 outputs the speed information that is outputted from the speed computation section 56 to the speed information service system 48.

An operation of an embodiment of the present invention will be explained hereinafter.

With reference to the flowchart shown in FIG. 3, a description of control that is performed at the CPU 12 of the navigation device 10 will be made hereinafter. This control is carried out when an unillustrated supply power of the navigation device 10 is closed.

Figure 3:
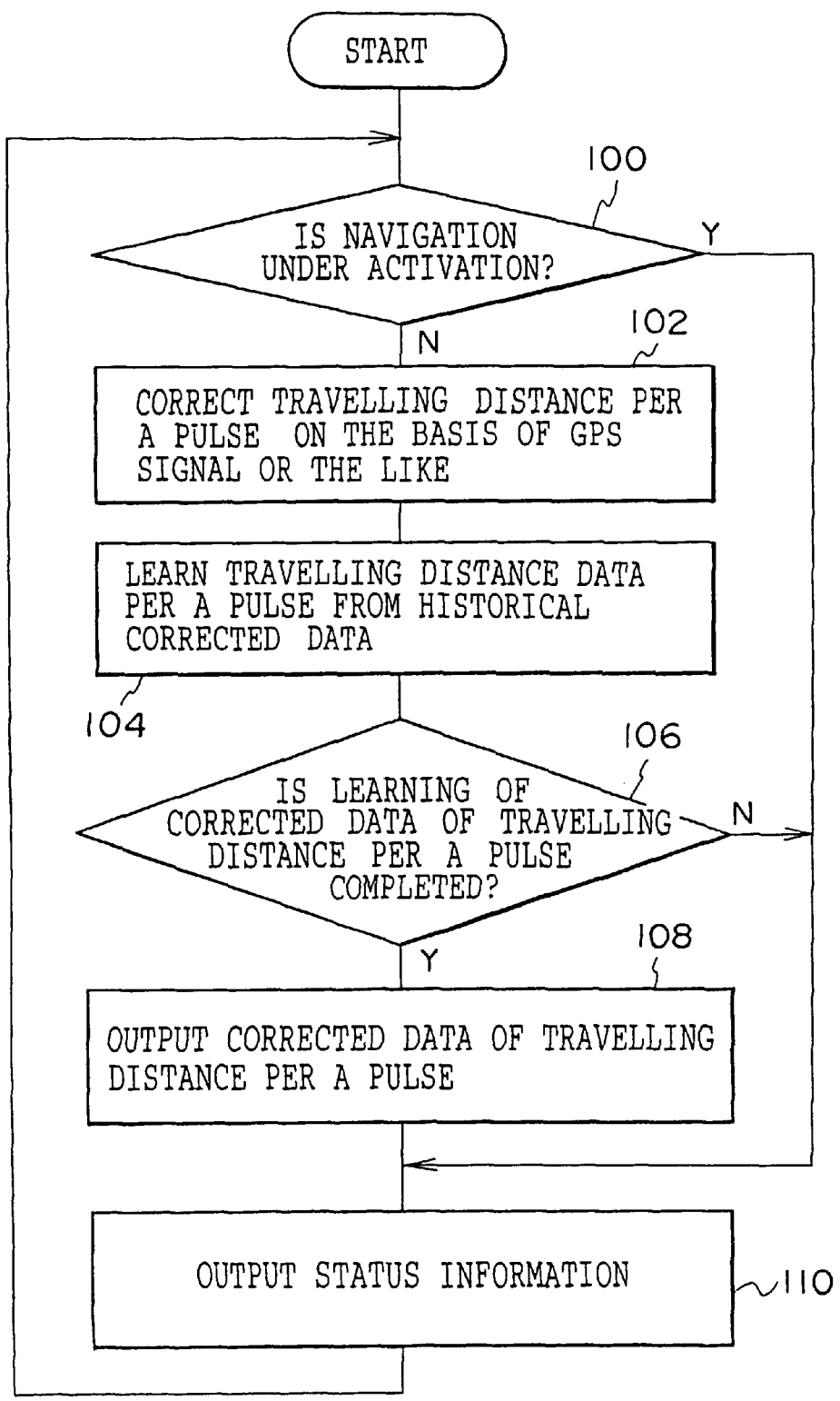
FIG. 3 is a flowchart illustrating a control flow that is executed at a CPU12.

In FIG. 3, at step 100, it is judged whether navigation is under activation. "Under activation" means a case in which, immediately after the power is supplied, a vehicle position is specified on the basis of a GPS signal received by the GPS receiver 24, a DGPS signal received by the DGPS receiver 25, vehicle travelling direction data outputted from the gyro sensor 38, and a vehicle speed pulse signal outputted from the vehicle speed sensor 40, and the like.

It is affirmative at step 100 if the navigation is under activation. The routine proceeds to step 110 where status information indicating that navigation is under activation is outputted to the navigation correction information data storage section 50. When the navigation is not under activation, it is negative at step 100 and at step 102, on the basis of the GPS signal received by the GPS receiver 24 and the DGPS signal received by the DGPS receiver 25, travelling distance data per a pulse of a vehicle speed pulse signal is corrected, and the corrected travelling distance data per a pulse is stored in the RAM 14.

In the present embodiment, in order to correct travelling distance data per a pulse more accurately, at the next step 104, "learning" is carried out.

At step 104, the corrected data of a travelling distance per a pulse i.e., more accurate travelling distance data per a pulse is learned from historical data stored in the RAM 14 by using a predetermined algorithm. Then, at step 106, it is judged whether learning of the corrected data of a travelling distance per a pulse has been completed. This judgment is performed by judging whether the learning of the corrected data of a travelling distance per a pulse has been performed, for example, while a vehicle is travelling at a predetermined distance or more.

In a case in which the learning is not completed, this judgment is negated at step 106. The routine proceeds to step 110 where status information indicating that the corrected data of a travelling distance per a pulse is under learning is outputted to the navigation correction information data storage section 50. When the learning has been finished, at step 106, the judgment is affirmed. At step 108, the corrected data of a travelling distance per a pulse is outputted to the navigation correction information data storage section 50. At the next step 110, status information indicating that the learning has been completed is outputted to the navigation correction information data storage section 50. Similar processings will be repeated hereinafter.

Next, with reference to the flowchart shown in FIG. 4, a description of the control at the data switching section 54 will be made hereinafter.

Figure 4:
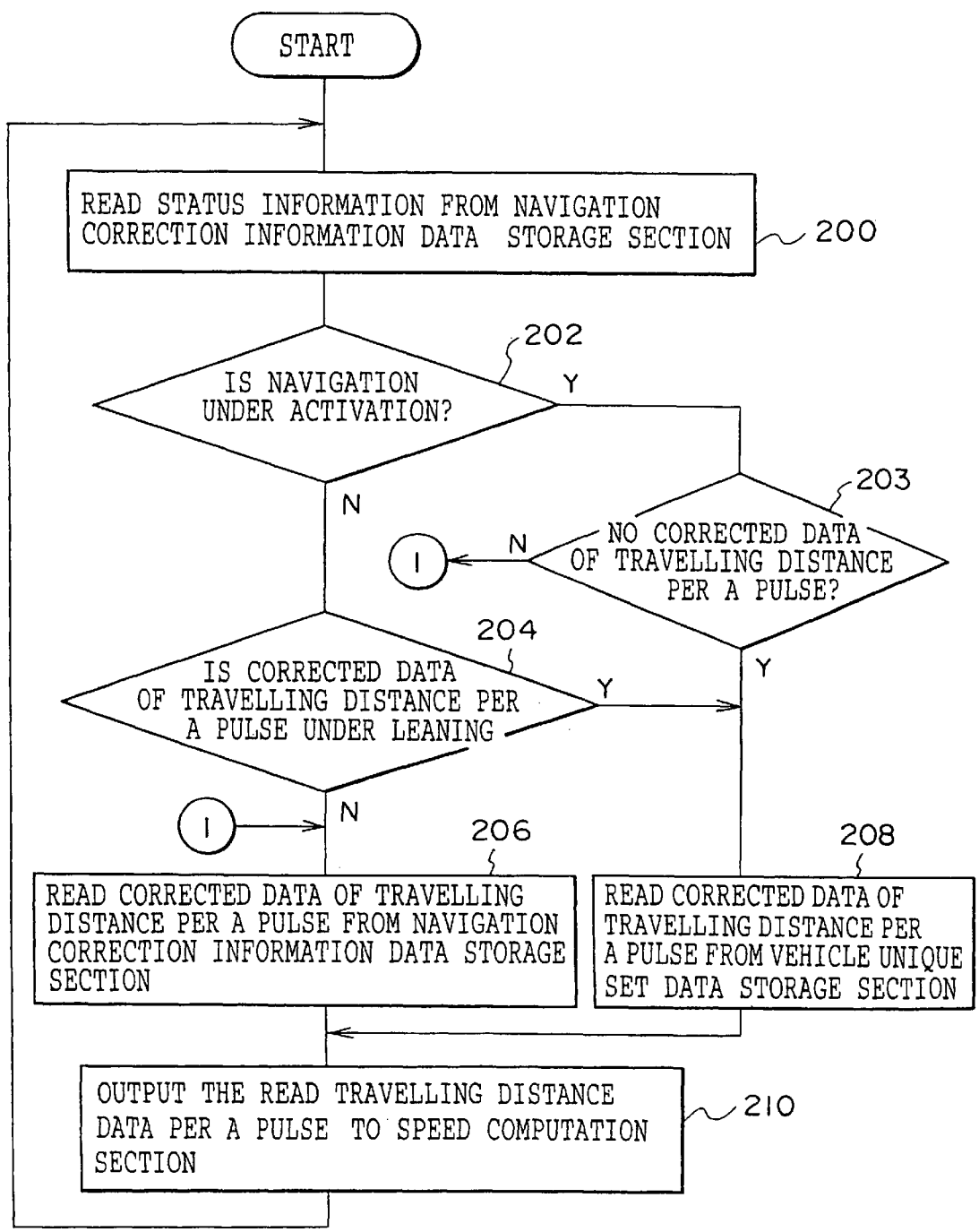
FIG. 4 is a flowchart illustrating a control flow that is executed at a data switching section.

At step 200 shown in FIG. 4, status information is read from the navigation correction information storage section 50. At the next step 202, it is judged whether the read status information is information indicating that navigation is under activation. When the navigation is not under activation, at step 202, the judgement is negated. At step 204, it is judged whether the read status information is information indicating that the corrected data of a travelling distance per a pulse is under learning. If it is not under learning, the judgment is negated at step 204. At step 206, the corrected data of a travelling distance per a pulse is read from the navigation correction information data storage section 50.

On the other hand, when the navigation is under activation, the judgment is affirmed at step 202. At step 203, it is judged whether the corrected data of a travelling distance per a pulse is not stored in the navigation correction information data storage section 50. When the corrected data of a travelling distance per a pulse is stored in the navigation correction information data storage section 50, the judgment is negated at step 203, and the routine proceeds to step 206.

When the corrected data of a travelling distance per a pulse is not stored in the navigation correction information data storage section 50, the judgment is affirmed at step 203. The routine proceeds to step 208. Further, when the corrected data of a travelling distance per a pulse is under learning, the judgment is affirmed at step 204, and the routine goes to step 203. At step 208, travelling distance data per a pulse is read from the vehicle unique set data storage section 52. At the next step 210, the read traveling distance data per a pulse (the corrected data of a travelling distance per a pulse read at step 206 or the travelling distance data per a pulse read at step 208) is outputted to the speed computation section 56. Similar processings will be repeated hereinafter.

With reference to the flowchart shown in FIG. 5, a description of the control of the speed computation section 56 will be explained hereinafter.

Figure 5:
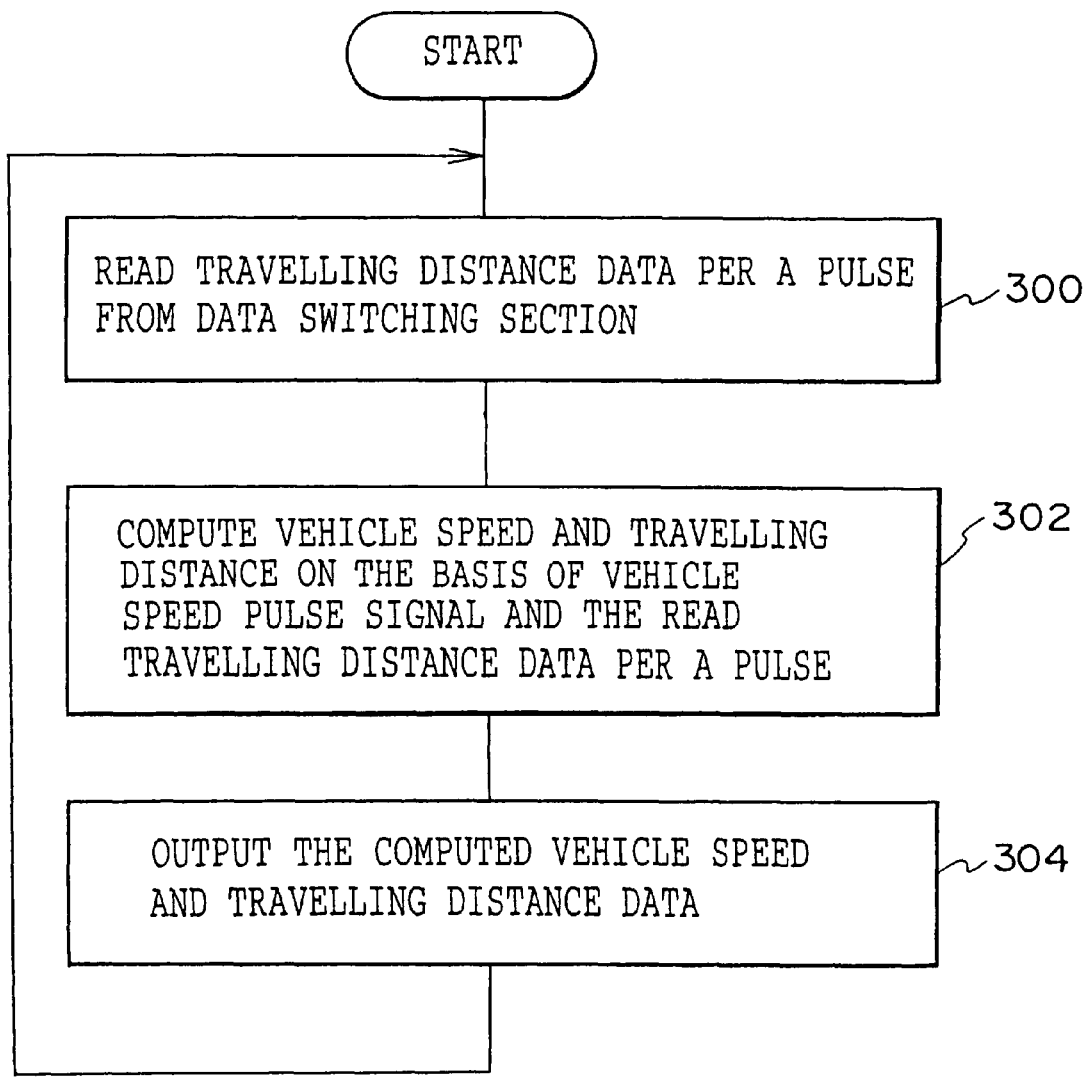
FIG. 5 is a flowchart illustrating a control flow that is executed at a speed computation section.

In FIG. 5, at step 300, travelling distance data per a pulse (the corrected data of a travelling distance per a pulse read at step 206 or the travelling distance data per a pulse read at step 208) is read from the data switching section 54. At the next step 302, on the basis of the vehicle speed pulse signal outputted from the vehicle speed sensor 40 and the travelling distance data per a pulse read at step 300, a vehicle speed and a travelling distance are computed. The travelling distance is determined by counting the number of pulses of a vehicle speed pulse signal and by multiplying the number of the pulses by the traveling distance data per a pulse. Also, the vehicle speed is determined from the travelling distance per unit time. Then, at the next step 304, the vehicle speed and the travelling distance data thus computed are outputted to the display section 58 and the speed information outputting section 60. Similar processings will be repeated hereinafter.

In this way, at the speed computation section 56, the corrected data of a travelling distance per a pulse inputted from the navigation device 10 is utilized to thereby determine the vehicle speed and the travelling distance. Therefore, even when a tire is worn or even when a tire size is changed, the vehicle speed and the travelling distance can be displayed with high accuracy. Further, at the speed information service system 48, because the corrected vehicle speed and the travelling distance data can be used, highly accurate control can be performed.

When corrected data of a travelling distance per a pulse has already been stored in the navigation correction information data storage section 50, the corrected data of the travelling distance per a pulse can be used immediately. Therefore, a vehicle speed or a travelling distance can be displayed promptly and highly accurately when the power is not supplied to the navigation device, immediately after the power is supplied, when the navigation is under activation, and during the "learning".

EFFECTS OF THE INVENTION

As described above, in accordance with claim 1 of the present invention, the speedometer for a vehicle comprises first storage means for storing travelling distance data per unit pulse of a vehicle speed pulse signal outputted from a vehicle speed sensor, correction means for correcting the travelling distance per unit pulse outputted from the vehicle speed sensor; second storage means for storing the corrected travelling distance data per unit pulse inputted from the correction means; and computation means for computing at least one of a vehicle speed and a travelling distance on the basis of the travelling distance data per unit pulse stored in the first storage means when the corrected travelling distance data per unit pulse is not stored in the second storage means, and for computing at least one of the vehicle speed and the travelling distance on the basis of the corrected travelling distance data per unit pulse when the corrected travelling distance data per unit pulse is stored in the second storage means. Consequently, according to the present invention, an effect can be provided that when a tire is worn or when a tire size is changed, a vehicle speed and a travelling distance is corrected highly accurately.

In accordance with claim 2 of the present invention, an effect can be provided that, since the vehicle speed which has been corrected by outputting means is outputted to a speed information service system, the speedometer for a vehicle can be controlled more highly accurately at the speed information service system.

What is claimed is:

1. A speedometer for a vehicle, comprising:

first storage means in which travelling distance data per unit pulse of a vehicle speed pulse signal outputted from a vehicle speed sensor is pre-stored, correction means including a navigation device for correcting travelling distance per unit pulse outputted from the vehicle speed sensor;

second storage means for storing the corrected travelling distance data per unit pulse inputted from the correction means;

computation means for computing:

at least one of the vehicle speed and the travelling distance on the basis of the travelling distance data per unit pulse that is pre-stored in the first storage means, in a state in which the correction means cannot correct travelling distance data per unit pulse and the corrected traveling distance data per unit pulse is not stored in the second storage means;

at least one of the vehicle speed and the travelling distance on the basis of the corrected travelling distance data per unit pulse, that is stored in the second storage means, in a state in which the correction means cannot correct travelling distance data per unit pulse and the corrected travelling distance data per unit pulse is stored in the second storage means; and at least one of the vehicle speed and the travelling distance on the basis of the corrected travelling distance data per unit pulse, in a state in which the correction means can correct travelling distance data per unit pulse, and switching means for conducting data from one of said first or second storage to said computation means.

2. A speedometer for a vehicle according to claim 1, further comprising outputting means for outputting the vehicle speed computed by the computation means.

* * * * *